(12) United States Patent
Zhang et al.

(10) Patent No.: US 11,740,503 B2
(45) Date of Patent: Aug. 29, 2023

(54) DISPLAY SCREEN AND ELECTRONIC DEVICE

(71) Applicant: TCL CHINA STAR OPTOELECTRONICS TECHNOLOGY CO., LTD., Shenzhen (CN)

(72) Inventors: Guiyang Zhang, Shenzhen (CN); Guowei Zha, Shenzhen (CN)

( * ) Notice: Subject to any disclaimer, the term of this patent is extended or adjusted under 35 U.S.C. 154(b) by 452 days.

(21) Appl. No.: 16/982,601

(22) PCT Filed: Aug. 5, 2020

(86) PCT No.: PCT/CN2020/106989
§ 371 (c)(1),
(2) Date: Sep. 21, 2020

(87) PCT Pub. No.: WO2021/223337
PCT Pub. Date: Nov. 11, 2021

(65) Prior Publication Data
US 2023/0105947 A1    Apr. 6, 2023

(30) Foreign Application Priority Data

May 6, 2020 (CN) .......................... 202010371011.6

(51) Int. Cl.
*G02F 1/1335* (2006.01)
*G06V 40/13* (2022.01)
*G02F 1/1333* (2006.01)

(52) U.S. Cl.
CPC .... *G02F 1/133512* (2013.01); *G02F 1/13338* (2013.01); *G02F 1/133514* (2013.01); *G06V 40/13* (2022.01)

(58) Field of Classification Search
CPC ......... G02F 1/133512; G02F 1/133514; G02F 1/13338; G06V 40/13
See application file for complete search history.

(56) References Cited

FOREIGN PATENT DOCUMENTS

| CN | 110286514 A | * | 9/2019 | ......... G02F 1/13338 |
|---|---|---|---|---|
| CN | 110308583 A | | 10/2019 | |
| CN | 110309705 A | | 10/2019 | |
| CN | 110333620 A | * | 10/2019 | ....... G02F 1/133512 |
| CN | 110333620 A | | 10/2019 | |
| CN | 110908174 A | | 3/2020 | |
| CN | 110928020 A | | 3/2020 | |
| KR | 20170051797 A | * | 5/2017 | |

OTHER PUBLICATIONS

Chinese Office Action issued in corresponding Chinese Patent Application No. 202010371011.6 dated Feb. 14, 2023, pp. 1-6.

* cited by examiner

*Primary Examiner* — Jessica M Merlin

(57) ABSTRACT

A display screen and an electronic device are provided. The display screen includes an anti-interference film. The anti-interference film includes a plurality of light-shielding sublayers. Each of the light-shielding sublayers includes a plurality of opening portions and a plurality of light-shielding portions. An orthographic projection of light-shielding portions of one of two adjacent light-shielding sublayers on the liquid crystal display panel partially overlaps with an orthographic projection of opening portions of the other light-shielding sublayer on the liquid crystal display panel.

18 Claims, 3 Drawing Sheets

DISPLAY SCREEN AND ELECTRONIC DEVICE

FIELD OF INVENTION

The present disclosure relates to the technical field of display, and particularly to a display screen and an electronic device.

BACKGROUND

Light can pass through transparent medium layers. A fingerprint can reflect light emitted by a display panel, and ridges and valleys of the fingerprint produce optical signals with different intensities. These signals with different intensities are received by optical sensors below a transparent medium layer to realize optical fingerprint recognition. In this way, fingerprint recognition can be realized while displaying, without sacrificing a display area. A main bottleneck of optical fingerprint recognition is how to build an optical path system matched with optical sensors in an ultra-thin device.

Currently, optical fingerprint recognition schemes based on active light-emitting organic light-emitting diode displays are mature. In contrast, liquid crystal display panels emit light passively. Because liquid crystal display panels have too much internal noise interference and are limited by their structure, optical fingerprint recognition schemes cannot be applied to liquid crystal display panels currently. Liquid crystal display panels can only use external fingerprint recognition modules, which reduce screen-to-body ratios of display screens.

SUMMARY OF DISCLOSURE

A purpose of the present disclosure is to provide a display screen with an improved screen-to-body ratio and an electronic device comprising the same.

In order to solve the above technical problem, the present disclosure provides a display screen, comprising:
  a liquid crystal display panel comprising a light-transmitting area; and
  a fingerprint recognition module embedded in the liquid crystal display panel and comprising:
    a fingerprint sensor corresponding to the light-transmitting area and comprising a first side close to a light-emitting side of the liquid crystal display panel; and
    an anti-interference film disposed on the first side of the fingerprint sensor, corresponding to the fingerprint sensor, and comprising a plurality of light-shielding sublayers, wherein each of the light-shielding sublayers comprises a plurality of opening portions and a plurality of light-shielding portions, and an orthographic projection of light-shielding portions of one of two adjacent light-shielding sublayers on the liquid crystal display panel partially overlaps with an orthographic projection of opening portions of the other light-shielding sublayer on the liquid crystal display panel.

The present disclosure further provides an electronic device comprising the aforementioned display screen.

A display screen and an electronic device of the present invention each comprise: a liquid crystal display panel comprising a light-transmitting area, and a fingerprint recognition module embedded in the liquid crystal display panel. The fingerprint recognition module comprises: a fingerprint sensor corresponding to the light-transmitting area and comprising a first side close to a light-emitting side of the liquid crystal display panel, and an anti-interference film disposed on the first side of the fingerprint sensor and corresponding to the fingerprint sensor. The anti-interference film comprises a plurality of light-shielding sublayers. Each of the light-shielding sublayers comprises a plurality of opening portions and a plurality of light-shielding portions. An orthographic projection of light-shielding portions of one of two adjacent light-shielding sublayers on the liquid crystal display panel partially overlaps with an orthographic projection of opening portions of the other light-shielding sublayer on the liquid crystal display panel. Because the fingerprint recognition module is embedded in the liquid crystal display panel, and the anti-interference film is disposed on a light-emitting side of the fingerprint sensor, an optical fingerprint recognition scheme can be applied in the liquid crystal display panel to increase a screen-to-body ratio of the display screen.

DETAILED DESCRIPTION

Figure 1:
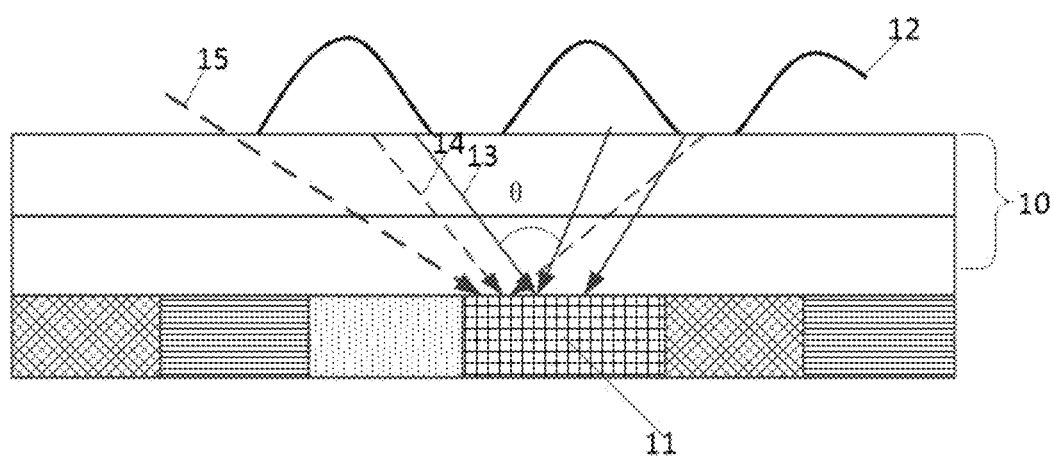
FIG. 1 is a diagram of a principle of optical fingerprint recognition in a display screen in the prior art.

The following description of various embodiments of the present disclosure with reference to the accompanying drawings is used to illustrate specific embodiments that can be practiced. Directional terms mentioned in the present disclosure, such as "above", "below", "front", "back", "left", "right", "inside", "outside", "side", are merely used to indicate the direction of the accompanying drawings. Therefore, the directional terms are used for illustrating and understanding the present disclosure rather than limiting the present disclosure. In the figures, elements with similar structures are indicated by the same reference numerals.

As shown in FIG. 1, optical signals received by a fingerprint sensor 11 comprise: light 13 reflected by a fingerprint, light 14 reflected by an upper layer 10 of the fingerprint sensor 11, and ambient light 15. The light 13 reflected by the fingerprint is a useful optical signal, and the other two are noise optical signals. A fingerprint signal 12 comprises information of ridges and valleys of the fingerprint. Refractive indexes of the ridges and valleys are about 1.4, and a refractive index of a glass cover plate of a display screen is about 1.5, which are very close. Therefore, when the fingerprint touches the cover plate, the ridges contact the cover plate, and optical signals reflected by the ridges are very weak. There is air between the valleys and the cover plate (the refractive index of air is 1). Reflection of the valleys is composed of reflection between the glass cover plate and the air and reflection between the valleys and the air. A reflection intensity of the valleys is much greater than that of the ridges. The fingerprint signal 12 with a light and dark distribution is received by the fingerprint sensor 11, and fingerprint recognition is completed through photoelectric conversion. Ideally, the fingerprint sensor 11 receives a fingerprint signal within an angle range of ±θ degrees. When the noise optical signals with other angles are strong, the fingerprint signal will be submerged, and fingerprint information cannot be recognized.

Figure 2:
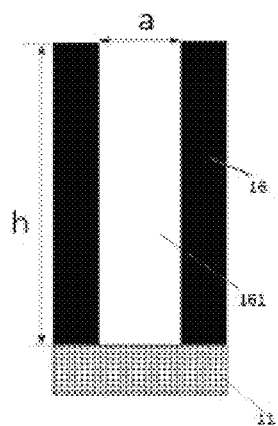
FIG. 2 is a cross-sectional view of a collimated hole in the prior art.
Figure 3:
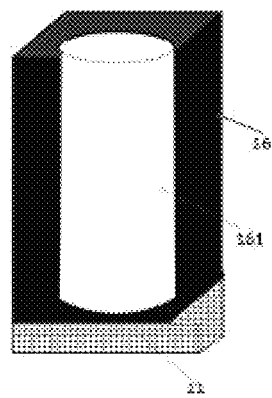
FIG. 3 is a three-dimensional view of the collimated hole in the prior art.

In order to improve a signal-to-noise ratio of the fingerprint signal, it is necessary to reduce an influence of the noise optical signals with large angles. As shown in FIG. 2 and FIG. 3, a hole 161 in a light-shielding layer 16 is configured to eliminate an influence of interference light with large-angle and improve the signal-to-noise ratio. In order to effectively shield the interference light, a ratio of a height h of the hole 161 to an aperture a of the hole 161 is required to be 6:1 or more, that is, h/a≥6:1. Usually, a size of a silicon-based fingerprint sensor is about 3-5 µm. To achieve the ratio of 6:1, the height h of the hole 161 is at least 18 µm.

In particular, a fingerprint sensor 11 of a current liquid crystal display panel is usually a glass-based fingerprint sensor. Usually, a size of the glass-based fingerprint sensor is about 20-40 µm. Such a large fingerprint sensor 11 is shielded by a hole 161 to realize fingerprint recognition, and a height h of the hole 161 is at least 120 µm. Because a height (thickness) of a liquid crystal display panel is only about 3 µm, obviously, conventional hole shielding methods cannot be applied to fingerprint recognition of display screens of liquid crystal display panels.

Figure 4:
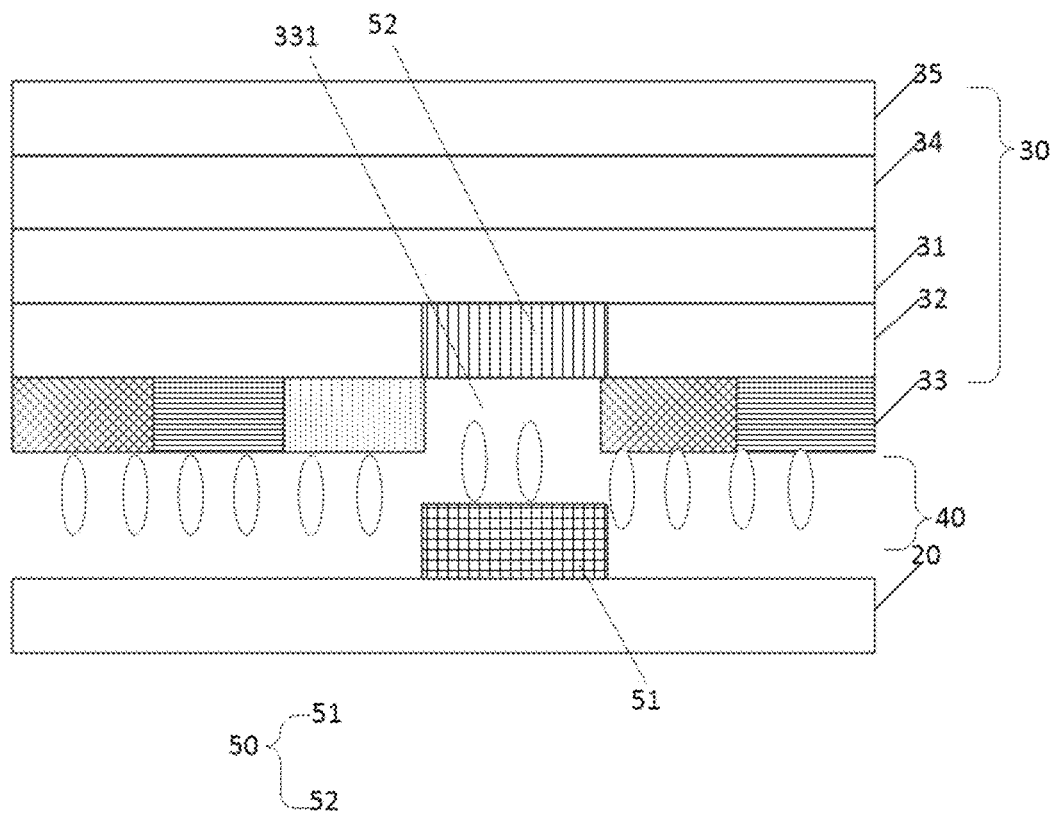
FIG. 4 is a cross-sectional view of a display screen according to an embodiment of the present disclosure.

Please refer to FIG. 4 to FIG. 7. FIG. 4 is a cross-sectional view of a display screen according to an embodiment of the present disclosure.

In an embodiment, the display screen of the present disclosure comprises a liquid crystal display panel and a fingerprint recognition module.

As shown in FIG. 4, the liquid crystal display panel comprises a light-transmitting area (not shown). The liquid crystal display panel further comprises a first substrate 20, a second substrate 30, and a liquid crystal layer 40 disposed between the first substrate 20 and the second substrate 30. The second substrate 30 is close to a light-emitting side of the liquid crystal display panel. In an embodiment, the first substrate 20 is an array substrate. The first substrate 20 is provided with scan lines and data lines. The second substrate 30 is a color filter substrate. The second substrate 30 comprises a base substrate 31 and a color resist layer 33. The color resist layer 33 is disposed below the base substrate 31, that is, close to the liquid crystal layer 40. The color resist layer 33 comprises a plurality of color resists, comprising red color resists, blue color resists, and green color resists. The color resist layer 33 is provided with a plurality of first openings 331. A polarizer 34 and a glass cover plate 35 may also be disposed on the base substrate 31. The polarizer 34 may be bonded to the glass cover plate 35 by an optical glue. Please refer to FIG. 5, in a top view, the liquid crystal display panel further comprises a plurality of pixel units 60.

The fingerprint recognition module 50 is embedded in the liquid crystal display panel and corresponds to the light-transmitting area. The fingerprint recognition module 50 comprises a plurality of fingerprint sensors 51 and anti-interference films 52.

Figure 5:
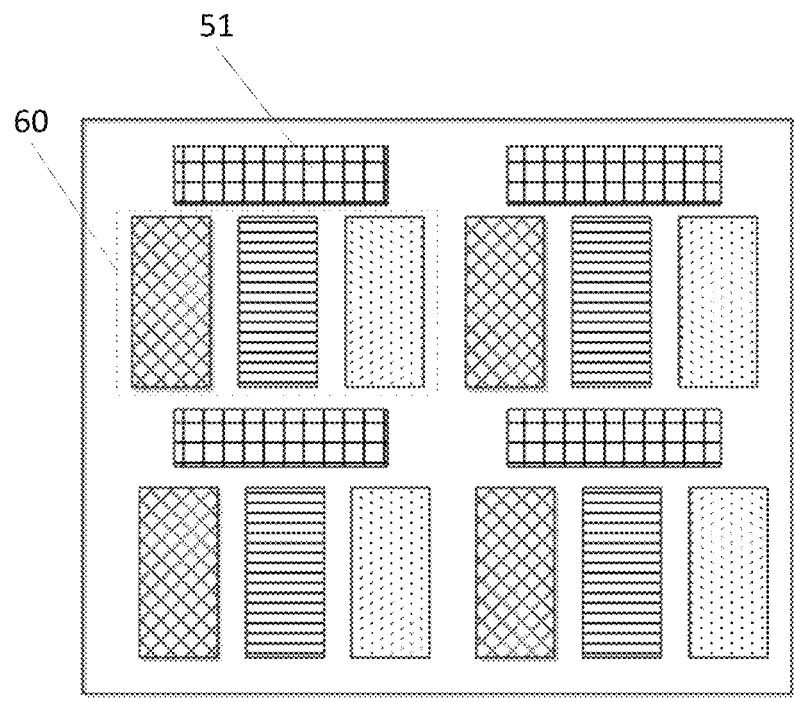
FIG. 5 is a top view of a fingerprint sensor in FIG. 4.

The fingerprint sensors 51 may be optical sensors. In an embodiment, in order to further increase an aperture ratio, the scan lines cover the fingerprint sensors 51. That is, positions of the fingerprint sensors 51 correspond to positions of the scan lines. As shown in FIG. 5, the scan lines are disposed in a horizontal direction, and the fingerprint sensors 51 are also disposed in the horizontal direction. It can be seen from the top view that the fingerprint sensors 51 are disposed at the positions of the scan lines. Because a width of the scan lines is relatively wide, and the scan lines are usually covered with a light-shielding layer, placing the fingerprint sensor 51 here can minimize a loss of the aperture ratio. In an embodiment, in order to further improve a flexibility of the display screen, the fingerprint sensors 51 correspond to the pixel units 60.

Figure 6:
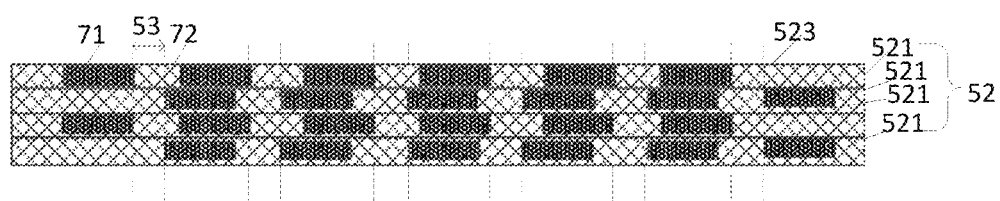
FIG. 6 is a cross-sectional view of an anti-interference film in FIG. 4.
Figure 7:
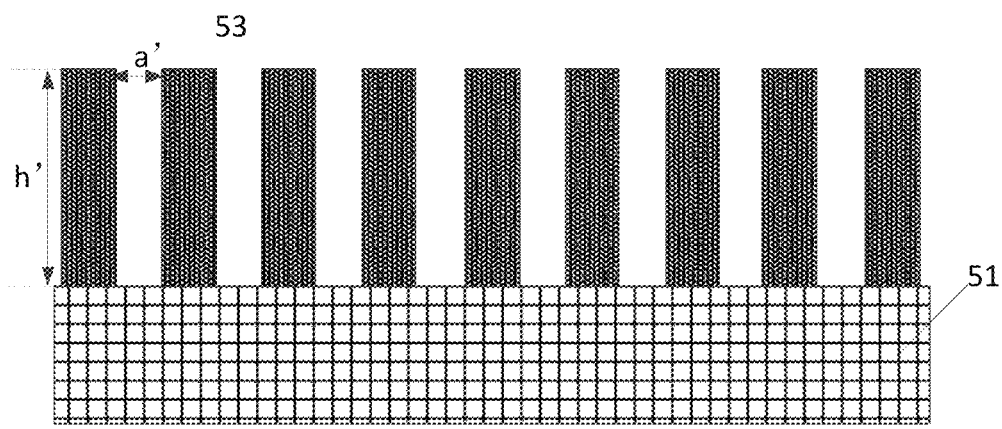
FIG. 7 is an equivalent diagram of a fingerprint recognition module in FIG. 4.

The anti-interference films 52 are disposed on first sides of the fingerprint sensors 51. The first sides are close to the light-emitting side of the liquid crystal display panel. For example, the anti-interference films 52 are disposed on the fingerprint sensors 51. The anti-interference films 52 correspond to the fingerprint sensors 51. As shown in FIG. 6, each of the anti-interference films 52 comprises a plurality of light-shielding sublayers 521. Each of the light-shielding sublayers 521 comprises a plurality of light-shielding portions 71 and a plurality of opening portions 82. An orthographic projection of light-shielding portions 71 of one of two adjacent light-shielding sublayers 521 on the liquid crystal display panel partially overlaps with an orthographic projection of opening portions 72 of the other light-shielding sublayer 521 on the liquid crystal display panel. That is, light-shielding portions 71 of one of two adjacent light-shielding sublayers 521 and light-shielding portions 71 of the other light-shielding sublayers 521 are staggered. Please refer to FIG. 6 and FIG. 7, in an embodiment, in order to further improve accuracy of fingerprint recognition, each of the anti-interference films 52 further comprises a plurality of light-transmitting holes 53. A ratio of a total thickness of each of the anti-interference films 52 to an aperture a' of each of the light-transmitting holes 53 is 6:1 or more. In order to further reduce interference signals, the aperture a' of each of the light-transmitting holes 53 is 1 µm to 2 µm. In an embodiment, a distance between two adjacent light-shielding portions 71 is 3 µm to 4 µm. In an embodiment, in order to further improve display effect, a flat layer 523 is disposed between two adjacent light-shielding sublayers 521. The flat layer 523 is made of a transparent resin. A thickness of each of the light-shielding sublayers 521 is less than 2 µm. A height h' of each of the light-transmitting holes 53 is about 6 µm.

In a specific manufacturing process, a light-shielding material (such as black matrix, MoOx, etc.) is first formed into a film below the base substrate 31, and the film is patterned to form the light-shielding portions 71. Then, a transparent resin layer may be made for planarization. The above operations are repeated to fabricate the light-shielding sublayers layer by layer. Light-shielding portions 71 of two adjacent light-shielding sublayers 521 are staggered. Because accuracy of current patterning processes of liquid crystal display panels is only 3-4 µm, use of such alternately arranged light-shielding sublayers 521 can realize light transmitting holes 53 with an aperture a' of 1-2 µm. In addition, the above structure can reduce the height h' of each of the light-transmitting holes 53, so that a ratio of a total height of a stack of the light-shielding sublayers 521 to the aperture a' is 6:1 or more, and optical fingerprint recognition can be realized.

In an embodiment, in order to further improve accuracy of the fingerprint signal, the fingerprint sensors 51 are disposed on a light-emitting side of the first substrate 20, and the anti-interference films 52 are disposed in the second substrate 30. In an embodiment, positions of the first openings 331 correspond to positions of the anti-interference films 52.

That is, no color resist is disposed at positions corresponding to the anti-interference films 52.

In order to improve the accuracy of the fingerprint signal, the second substrate 30 further comprises a base substrate 31. The color resist layer 33 is disposed on a side of the base substrate 31 close to the liquid crystal layer 40. The anti-interference films 52 are disposed between the base substrate 31 and the color resist layer 33, but the positions of the anti-interference films 52 are not limited thereto. For example, the anti-interference films 52 are disposed below the color resist layer 33.

In an embodiment, in order to further improve the display effect and prevent color shift, the liquid crystal display panel further comprises a buffer layer 32. The buffer layer 32 is disposed between the base substrate 31 and the color resist layer 33. The buffer layer 32 is provided with a plurality of second openings (not shown). The anti-interference films 52 are disposed in the second openings. That is, the buffer layer 32 covers an underside of the base substrate 31 except the anti-interference films 52, and a thickness of the buffer layer 32 is consistent with a thickness of the anti-interference films 52. The buffer layer 32 may be made of a transparent resin.

In other embodiments, the anti-interference films 52 and the fingerprint sensors 51 may be disposed on the first substrate 20 or the second substrate 30 at same time, and their specific configuration is not limited.

Each anti-interference film comprises stacked light-shielding layers, and light-shielding portions are staggered to form a collimated optical path structure. This greatly decreases a difficulty of optical paths, solves problems of insufficient thickness and processing precision of liquid crystal display panels, and increases screen-to-body ratios. Furthermore, this fully fits current manufacturing processes of liquid crystal display panels, and its development process is simple, low-cost, suitable for large-scale mass production, and hardly changes manufacturing processes of liquid crystal display panels. Compared with conventional collimating lens solutions, fingerprint optical paths integrated into liquid crystal display panels do not require fingerprint recognition modules to be installed outside, thereby reducing overall thicknesses of display screens. In addition, half-screen, full-screen, and multiple fingerprint recognition can be easily realized.

The present disclosure further provides an electronic device comprising any of the aforementioned display screens. The electronic device may be a mobile phone, a tablet computer, a computer, etc.

A display screen and an electronic device of the present invention each comprises: a liquid crystal display panel comprising a light-transmitting area, and a fingerprint recognition module embedded in the liquid crystal display panel. The fingerprint recognition module comprises: a fingerprint sensor corresponding to the light-transmitting area and comprising a first side close to a light-emitting side of the liquid crystal display panel, and an anti-interference film disposed on the first side of the fingerprint sensor and corresponding to the fingerprint sensor. The anti-interference film comprises a plurality of light-shielding sublayers. Each of the light-shielding sublayers comprises a plurality of opening portions and a plurality of light-shielding portions. An orthographic projection of light-shielding portions of one of two adjacent light-shielding sublayers on the liquid crystal display panel partially overlaps with an orthographic projection of opening portions of the other light-shielding sublayer on the liquid crystal display panel. Because the fingerprint recognition module is embedded in the liquid crystal display panel, and the anti-interference film is disposed on a light-emitting side of the fingerprint sensor, an optical fingerprint recognition scheme can be applied in the liquid crystal display panel to increase a screen-to-body ratio of the display screen.

The present invention has been described in the above preferred embodiments, but the preferred embodiments are not intended to limit the present invention. Those skilled in the art may make various changes and modifications without departing from the scope of the present invention. The scope of the present invention is determined by claims.

What is claimed is:

1. A display screen, comprising:
a liquid crystal display panel comprising a light-transmitting area; and
a fingerprint recognition module embedded in the liquid crystal display panel and comprising:
a fingerprint sensor corresponding to the light-transmitting area and comprising a first side close to a light-emitting side of the liquid crystal display panel; and
an anti-interference film disposed on the first side of the fingerprint sensor, corresponding to the fingerprint sensor, and comprising a plurality of light-shielding sublayers, wherein each of the light-shielding sublayers comprises a plurality of opening portions and a plurality of light-shielding portions, and an orthographic projection of light-shielding portions of one of two adjacent light-shielding sublayers on the liquid crystal display panel partially overlaps with an orthographic projection of opening portions of the other light-shielding sublayer on the liquid crystal display panel; the liquid crystal display panel further comprises a second substrate close to the light-emitting side; the second substrate further comprises a base substrate and a color resist layer, the color resist layer is disposed on a side of the base substrate close to the first substrate, and the anti-interference film is disposed between the base substrate and the color resist layer.

2. The display screen according to claim 1, wherein the anti-interference film further comprises a plurality of light-transmitting holes, and a ratio of a total thickness of the anti-interference film to an aperture of each of the light-transmitting holes is 6:1 or more.

3. The display screen according to claim 2, wherein the aperture of each of the light-transmitting holes is 1 μm to 2 μm.

4. The display screen according to claim 2, wherein a distance between two adjacent light-shielding portions is 3 μm to 4 μm.

5. The display screen according to claim 3, wherein the anti-interference film further comprises a plurality of flat layers made of a transparent resin, wherein each of the flat layers is disposed between two adjacent light-shielding sub-layers.

6. The display screen according to claim 1, wherein the liquid crystal display panel further comprises:
a first substrate provided with a scan line, wherein the scan line covers the fingerprint sensor.

7. The display screen according to claim 1, wherein
the liquid crystal display panel further comprises a first substrate;
the fingerprint sensor is disposed on a light-emitting side of the first substrate; and
the anti-interference film is disposed in the second substrate.

8. The display screen according to claim 7, wherein the color resist layer comprises a plurality of color resists and is provided with a first opening corresponding to the anti-interference film.

9. The display screen according to claim 1, wherein the liquid crystal display panel further comprises a buffer layer disposed between the color resist layer and the base substrate, the buffer layer is provided with a second opening, and the anti-interference film is disposed in the second opening.

10. An electronic device, comprising a display screen, wherein the display screen comprises:
 a liquid crystal display panel comprising a light-transmitting area; and
 a fingerprint recognition module embedded in the liquid crystal display panel and comprising:
  a fingerprint sensor corresponding to the light-transmitting area and comprising a first side close to a light-emitting side of the liquid crystal display panel; and
  an anti-interference film disposed on the first side of the fingerprint sensor, corresponding to the fingerprint sensor, and comprising a plurality of light-shielding sublayers, wherein each of the light-shielding sublayers comprises a plurality of opening portions and a plurality of light-shielding portions, and an orthographic projection of light-shielding portions of one of two adjacent light-shielding sublayers on the liquid crystal display panel partially overlaps with an orthographic projection of opening portions of the other light-shielding sublayer on the liquid crystal display panel; the liquid crystal display panel further comprises a second substrate close to the light-emitting side; the second substrate further comprises a base substrate and a color resist layer, the color resist layer is disposed on a side of the base substrate close to the first substrate, and the anti-interference film is disposed between the base substrate and the color resist layer.

11. The electronic device according to claim 10, wherein the anti-interference film further comprises a plurality of light-transmitting holes, and a ratio of a total thickness of the anti-interference film to an aperture of each of the light-transmitting holes is 6:1 or more.

12. The electronic device according to claim 11, wherein the aperture of each of the light-transmitting holes is 1 μm to 2 μm.

13. The electronic device according to claim 11, wherein a distance between two adjacent light-shielding portions is 3 μm to 4 μm.

14. The electronic device according to claim 10, wherein the anti-interference film further comprises a plurality of flat layers made of a transparent resin, wherein each of the flat layers is disposed between two adjacent light-shielding sub-layers.

15. The electronic device according to claim 10, wherein the liquid crystal display panel further comprises:
 a first substrate provided with a scan line, wherein the scan line covers the fingerprint sensor.

16. The electronic device according to claim 10, wherein the liquid crystal display panel further comprises a first substrate
 the fingerprint sensor is disposed on a light-emitting side of the first substrate; and
 the anti-interference film is disposed in the second substrate.

17. The electronic device according to claim 16, wherein the color resist layer comprises a plurality of color resists and is provided with a first opening corresponding to the anti-interference film.

18. The electronic device according to claim 11, wherein the liquid crystal display panel further comprises a buffer layer disposed between the color resist layer and the base substrate, the buffer layer is provided with a second opening, and the anti-interference film is disposed in the second opening.

* * * * *